March 12, 1940.    J. B. HOYE ET AL    2,193,320
COMPUTER REGISTER
Filed Aug. 4, 1936    5 Sheets-Sheet 1

Inventors
JAMES B. HOYE
EDWARD A. SLYE
By N. Clay Lindsey
Attorney

Inventors
JAMES B. HOYE
EDWARD A. SLYE
By W. Clay Lindsey
Attorney

March 12, 1940.    J. B. HOYE ET AL    2,193,320
COMPUTER REGISTER
Filed Aug. 4, 1936    5 Sheets-Sheet 3

Inventors
JAMES B. HOYE
EDWARD A. SLYE

By W. Clay Lindsey
Attorney

March 12, 1940.　　　J. B. HOYE ET AL　　　2,193,320
COMPUTER REGISTER
Filed Aug. 4, 1936　　　5 Sheets—Sheet 4

Inventors
JAMES B. HOYE
EDWARD A. SLYE

By　*Clay Lindsey*
　　　Attorney

March 12, 1940.   J. B. HOYE ET AL   2,193,320
COMPUTER REGISTER
Filed Aug. 4, 1936   5 Sheets-Sheet 5

Inventors
JAMES B. HOYE
EDWARD A. SLYE

By *[signature]*

Attorney

Patented Mar. 12, 1940

2,193,320

UNITED STATES PATENT OFFICE 2,193,320

COMPUTER REGISTER

James Bernard Hoye, Hartford, and Edward Alfred Slye, East Hartford, Conn., assignors to Veeder-Root Incorporated, Hartford, Conn., a corporation of Connecticut Application August 4, 1936, Serial No. 94,176

36 Claims. (Cl. 235—144)

This invention relates to registering or counting apparatus and has particular application in registering or counting apparatus having means for registering the total amount or number of units of material dispensed and means for registering the total cost of the material dispensed on each transaction. As an instance of a use to which the improvements of the present invention may be applied, reference may be had to apparatus for dispensing gasoline or other fluids and wherein it is desired to register both the number of gallons dispensed and the cost thereof.

The aim of the invention is to provide an improved apparatus of this sort having various features of novelty and advantage and which is particularly characterized by its simplicity in construction, its compactness in arrangement, its economy in manufacture, the ease and facility with which the parts may be readily assembled, and its accuracy and effectiveness in operation.

A further aim of the invention is to provide an improved apparatus having registering means for registering or indicating the amount of liquid dispensed and the cost thereof and which, considering the operations performed and the functions accomplished, comprises a relatively few number of parts which may be economically manufactured and easily assembled.

A further aim of the invention is to provide an improved apparatus of this character wherein the numeral wheels, comprising the registering devices, may be very easily and quickly reset backwardly to zero, and during the resetting operation errors in registration, resulting from either accidental or deliberate causes, are effectively guarded against. More particularly, our improved arrangement is such that the numeral wheels may be reset to zero without introducing any errors in the registering operations due to backlash or lost motion, and it is impossible for the operator to fraudulently manipulate the resetting mechanism to increase the count.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

In the accompanying drawings, wherein is shown, for illustrative purposes, one embodiment which the present invention may take:

Figures 1, 2:
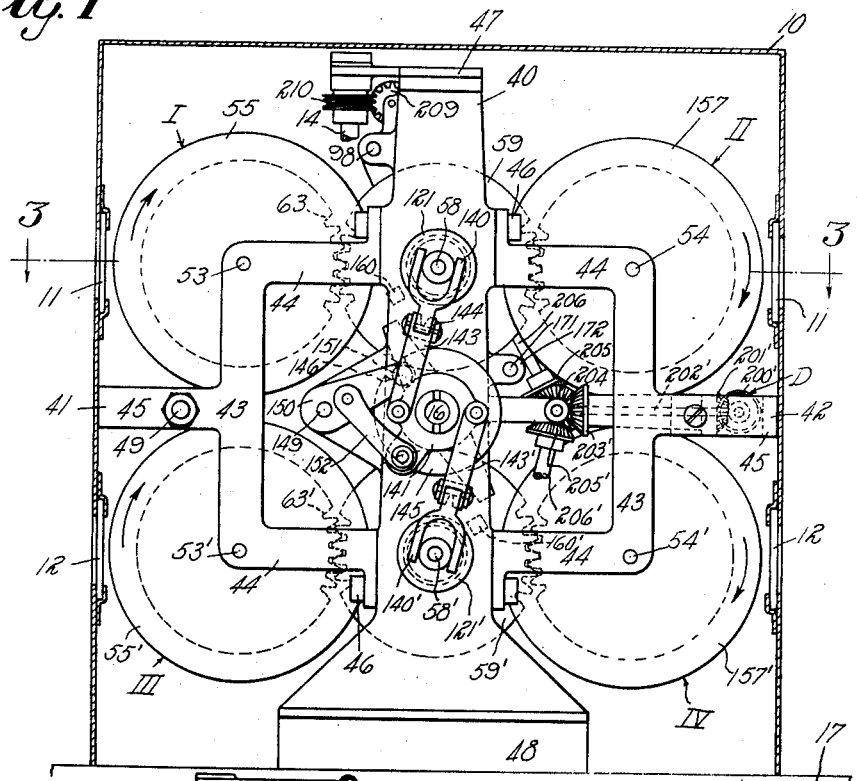
Figure 1 is a side elevational view of the apparatus, the casing being shown in section and parts being omitted in the interest of clearness.
Fig. 2 is a view similar to Fig. 1 but with the casing omitted and the right-hand side frame shown in Fig. 1 removed.
Figure 9:
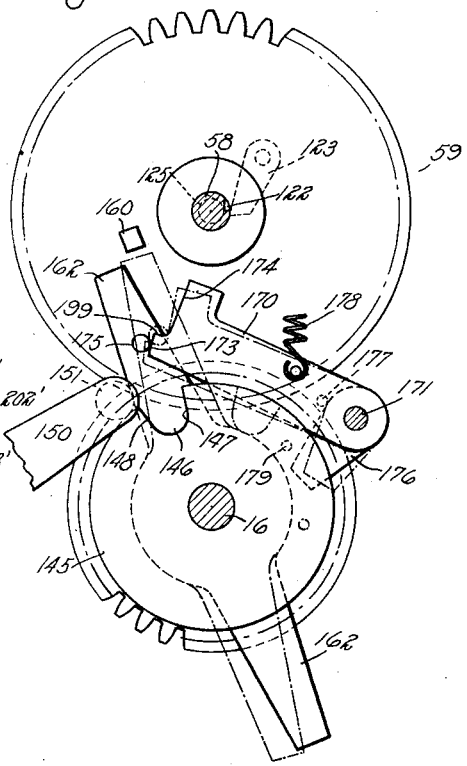
Figure 9A:
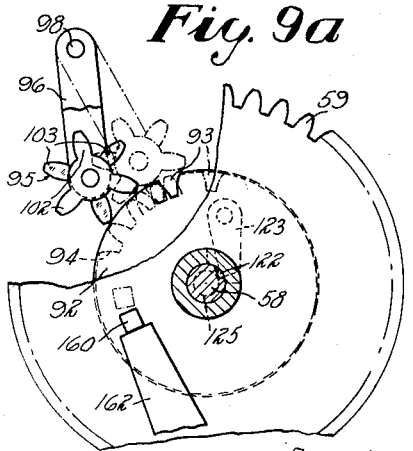
Figure 10:
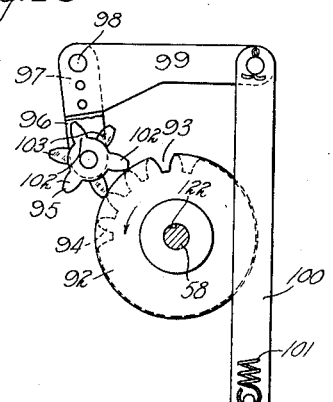
Figure 11:
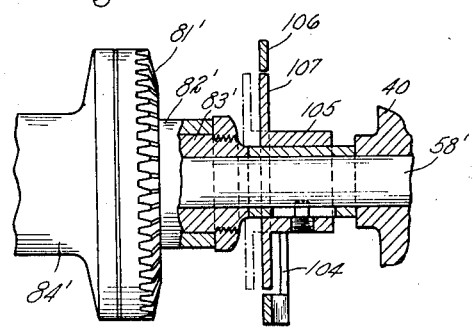
Figure 11:
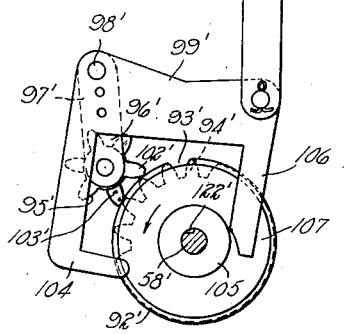
Figure 12:
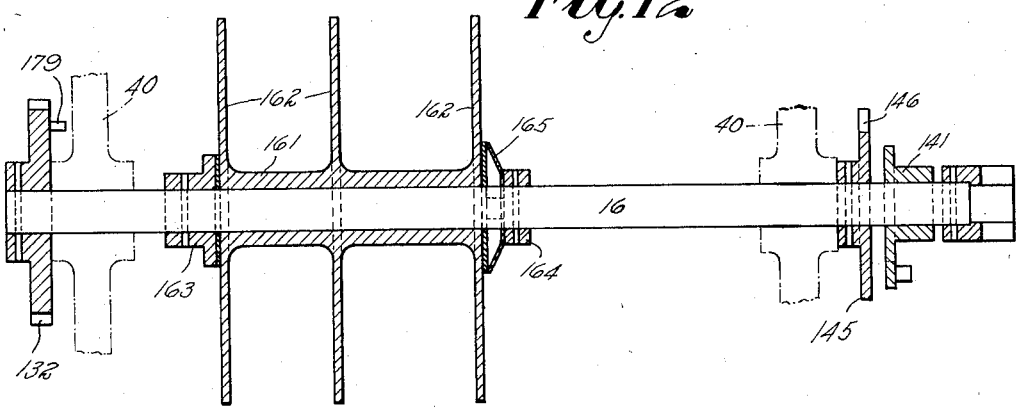

Fig. 9 is an enlarged fragmentary view showing, in full lines, the manner in which the overthrow preventing levers are held out of operative position upon initial rotation of the main reset shaft, and also showing, in dot and dash lines, the positions which the parts assume after initial rotation of the main reset shaft and during the actual resetting operation, this view being taken looking at the right-hand end of the reset shaft and the frame of the machine being omitted;

Fig. 9a is an enlarged fragmentary view showing the overthrow preventing mechanism in operative position and the movement of one of the transfer pinions at the completion of a resetting operation;

Fig. 10 is a detail view showing the manner in which the transfer pinions are locked against disarrangement during the operation of resetting the counter wheels associated therewith;

Fig. 11 is a view of a portion of the reset shaft associated with the amount registering means, portions of the parts illustrated being shown in section on substantially line 11—11 of Fig. 2; and Fig. 12 is a longitudinal sectional view showing the parts carried by the main reset shaft.

Referring generally to the construction shown in the drawings, 10 designates a casing of any suitable construction and having, in each of its front and rear faces, a pair of windows 11 and 12. Within the casing is a suitable frame which supports, in its upper portion, means for indicating the total cost of the liquid dispensed on each transaction and which means, in the present instance, includes two sets of numeral wheels I and II which are visible from opposite sides of the casing through the windows 11. Also supported by the casing and positioned below the cost indicators I and II is means for registering the amount of liquid dispensed on each transaction and which means also comprises two sets of numeral wheels III and IV visible from opposite sides of the casing through the windows 12. If desired, there may also be provided a totalizer D (Fig. 3) driven in unison with the amount indicators III and IV for registering the total quantity of liquid dispensed during a succession of transactions, and a like totalizer C driven in unison with the cost indicators I and II for registering the total amount of dollars and cents received for the quantity of liquid dispensed, as indicated by the totalizer D. The amount indicators are driven through a shaft 13 (Fig. 5) which is adapted to be connected to the meter shaft so that, in operation, it will always rotate at a speed determined by the drive of the pump which drives the meter. The cost registering mechanism is driven through a shaft 14 (Fig. 3) which, in turn, is driven through a variable speed mechanism in selected timed relation to the shaft 13 and in accordance with the selected unit price of liquid dispensed. The numeral 16 designates a main reset or operating shaft centrally positioned with respect to the price indicators and amount indicators and through which these several indicators are reset.

Figure 5:
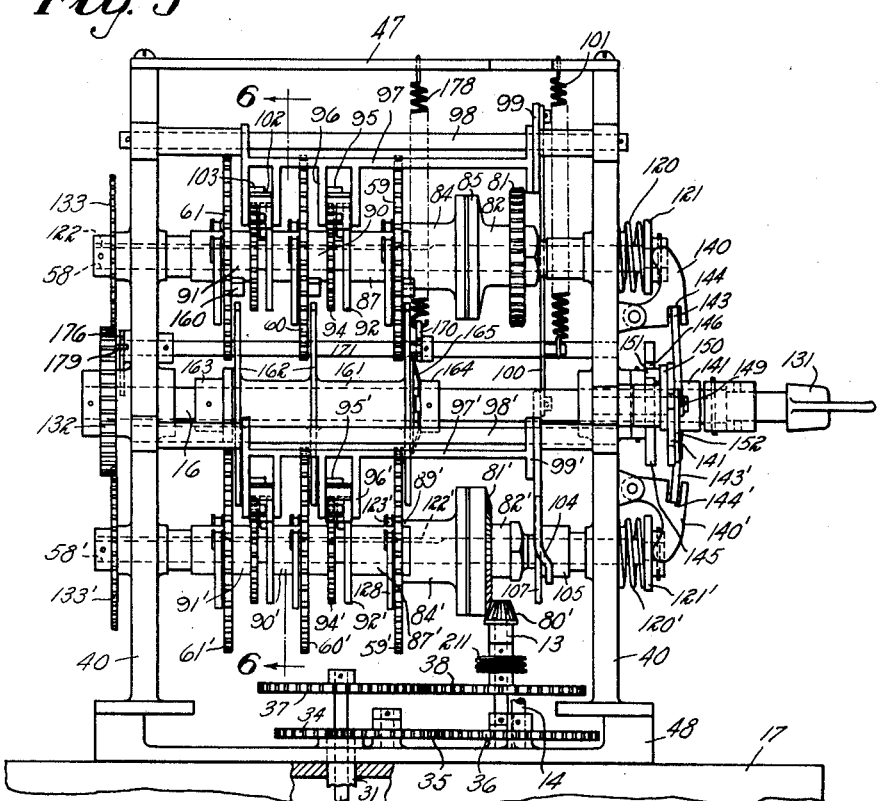
Fig. 5 is a front elevational view of the apparatus with the counter wheels and the shafts on which they are mounted omitted.
Figure 5A:
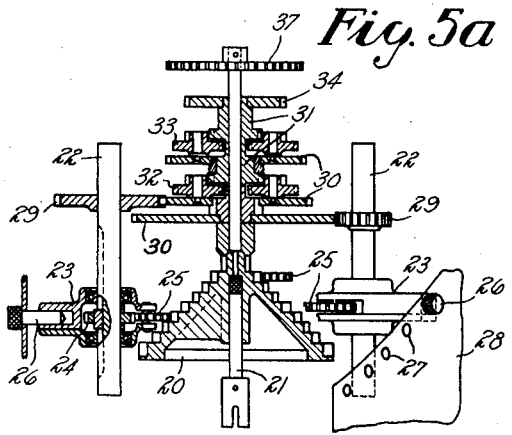
Fig. 5a is a diagrammatic layout illustrating one type of variator which may be used in connection with our improved register.
Figure 7:
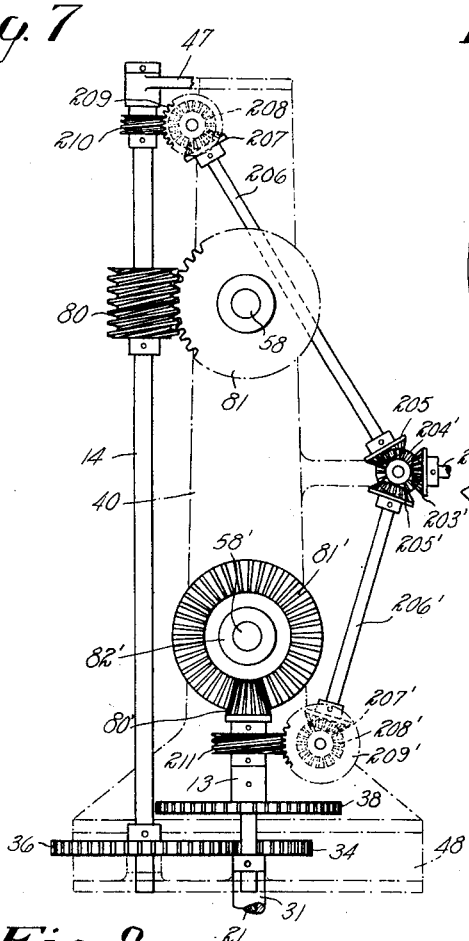
Fig. 7 is a fragmentary view showing portions of the drives for the amount indicators, the cost indicators, and the totalizers.

In the present illustrative disclosure, our improved registering mechanism is mounted on the top of a casing 17 which houses the variable speed mechanism which may be conveniently referred to as the variator. The variator may be of any suitable type but, for purposes of illustration, we have shown, in Fig. 5a, a structure such as disclosed in the Edward A Slye applications Serial Nos. 623,868 and 716,696. It includes a stepped cone gear 20 fixed to a shaft 21 which may be referred to as the meter shaft as it constitutes, in effect, an extension thereof. Disposed about the cone gear are three rotatable shafts 22, only two of which are illustrated. Slidably mounted on these shafts are shifting levers 23. Slidably fixed to each shaft 22 and located within a respective shifting lever is a gear 24 meshing with an intermediate gear 25 which, in turn, is adapted to be selectively engaged with the stepped portions of the cone gear. The shifting levers correspond respectively to fractions, cents, and tens of cents of the selected price per unit of measure, for example, gallons. They may be held in selected positions by any suitable means such, for example, as pins 26 adapted to be selectively received by the openings 27 in the range plates 28. Fixed to the upper ends of the shafts 22 are gears 29 respectively meshing with spur gears 30 disposed coaxially on the upper end of the meter shaft. Also, upon the upper end of the meter shaft are rotatably mounted two sleeves 31, and connected between these sleeves and the two upper gears 30 are two sets of planetary gearing, generally indicated at 32 and 33. As shown in Fig. 5, there is fixed to the end of the upper sleeve 31 a gear 34 meshing with a gear 35 which in turn meshes with a gear 36 fixed to the aforementioned shaft 14 associated with the cost registering mechanism. Fixed to the upper end of the meter shaft 21 is a gear 37 meshing with a gear 38 fixed to the aforementioned shaft 13 associated with the amount registering mechanism. It will be observed that with the arrangement described the meter shaft 21 and the shaft 13 will always rotate at the same speed and the shaft 14 will rotate at a different speed determined by the price setting of the several shifting levers.

Our improved register has a supporting structure which comprises a pair of end frames each of which includes a central section in the form of a flat vertical post 40 and a pair of side sections 41 and 42 of like construction. Each side section comprises a bracket having a vertically extending portion 43, arms 44 projecting in one direction from the ends of the portion 43, and a stem 45 projecting centrally from the portion 43 in the opposite direction. The two side sections are positioned in reverse relation to opposite sides of the central post 40, and the arms 44 are secured to the central post by bolts 46. The posts are held in spaced apart relation at their tops by a cross plate 47, and the posts are secured at their lower ends to a base plate 48 which rests upon the top of the variator casing 17. The two side sections 41 are transversely aligned and are tied together in spaced relation by a tie bolt 49. The side sections 42 are also transversely aligned and are tied together in spaced relation by a bracket 50 (Fig. 3) which, by preference, carries the totalizers C and D. It may be stated here that the supporting structure comprises three units, namely, a center unit composed of the two posts 40, a side unit composed of the two side sections 41, and another side unit composed of the sections 42. The center section, as hereinafter described more in detail, supports the main reset shaft 16 and the reset shafts 58 and 58' which are respectively associated with the cost and amount indicators, and each of the side frames carries one of the cost indicators and a corresponding amount indicator. This arrangement is of advantage in that assembly of a number of the apparatuses in mass production is greatly facilitated. A number of center units may be assembled on one line, and the side units on other lines. Then, after the units have been individually formed, they may be easily assembled into complete machines, it merely being necessary, in building each machine, to take one center unit and two side units and secure the side units to the center unit.

Figure 8:
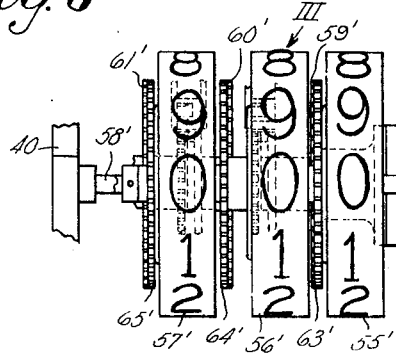
Fig. 8 is a detail view showing, in front elevation, one set of numeral wheels of the amount registering mechanism.

The cost registering mechanism and the amount registering mechanism are generally similar in construction, arrangement and operation and, therefore, a description of one will be sufficient to describe both. In the drawings, similar numerals are employed for designating corresponding parts of the two registering mechanisms but, in the case of the amount registering mechanism, the numerals are primed. Referring more particularly to the cost registering mechanism, the same includes the two sets of counter wheels I and II which are respectively mounted on shafts 53 and 54 respectively carried by the side sections of the supporting structure. The set I comprises three counter wheels 55, 56, and 57, respectively representing units of cents, tens of cents, and dollars, for example. The set II comprises corresponding counter wheels 155, 156, and 157 which are arranged in reverse order to those of the set I, as viewed in plan elevation, for the reason that the two sets are observable from opposite sides of the casing. Each of the wheels has, on its periphery, uniformly spaced numerals running from "0" to "9". During the operation of dispensing of liquid by the pump, the numerals on the set of wheels I will move upwardly past the left-hand window 11, and the numerals on the set of wheels II will move downwardly past the other window 11, reference being had to Fig. 1 in which the arrows indicate the direction of rotation of the several counter wheels. Similarly, the amount registering mechanism has two sets of counter wheels III and IV respectively mounted on shafts 53' and 54'. The set III (see Fig. 8) comprises three counter wheels 55', 56', and 57' respectively representing fractions, units, and tens of gallons of liquid dispensed, for example. The set of wheels IV comprises corresponding counter wheels of which wheel 157' is shown in Figs. 1 and 2.

The two sets I and II of counter wheels are operated through common operating means which is mounted upon a reset shaft 58 located midway between and in the plane of the shafts 53 and 54. Similarly, the two sets of amount counter wheels III and IV are operated through like mechanism mounted upon the reset shaft 58' located midway between and in the plane of the shafts 53' and 54'.

Figure 3:
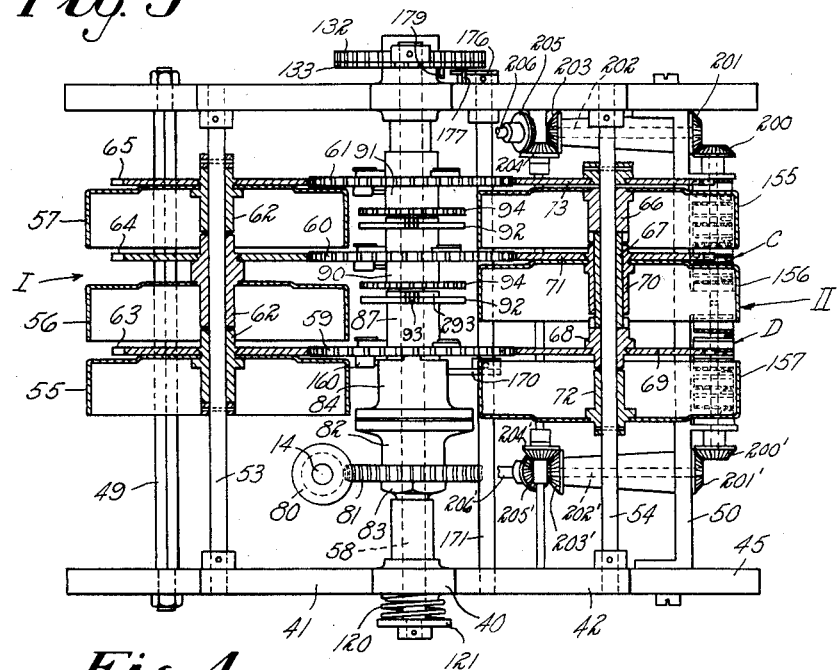
Fig. 3 is a fragmentary top plan view of the apparatus with parts of the cost registering mechanism shown in section on substantially line 3—3 of Fig. 1.

Referring more particularly to the manner in which the two sets of counter wheels I and II are associated, and as shown in Fig. 3, the cent wheels 55 and 155 are driven through a gear 59, the dime wheels 56 and 156 through a gear 60, and the dollar wheels 57 and 157 through a gear 61, these several gearings being journalled on the shaft 58 and there being transfer devices between the successive gears, as hereinafter described more in detail. In order to permit of this driving relation, (it being recalled that the wheels of the two sets are relatively in the reverse order) the following arrangement is adopted: The wheels 55, 56, and 57 are fixed to respective sleeves 62 which are freely journalled on the shaft 53 and fixed on these sleeves are the gears 63, 64, and 65, respectively meshing with the gears 59, 60, and 61. The cent wheel 155 is fixed to an interconnected three-part sleeve journalled on the shaft 54 and including a hub 66, a tube 67, and a hub 68. On the latter is staked a gear 69 meshing with the gear 59. The abutting ends of parts 66, 67, and 68 are provided with suitable interlocking connections, such as the interfitting tongue and slot portions shown, whereby any rotary movement transmitted to member 68 will result in a similar rotation of member 66 and cent wheel 155. The dime wheel 156 is staked to a sleeve 70 which is journalled on the tube 67, and staked to this sleeve is a gear 71 meshing with the gear 60. The dollar wheel 157 is staked to a hub 72 which is pinned to the shaft 54, the latter being rotatable in bearings in the end frames. Also fixed to the shaft 54 at the opposite ends of the set of wheels II is a gear 73 meshing with the gear 61. It will thus be seen that when the gear 59 is rotated, the wheel 55 will be directly driven and the wheel 155 will be driven in the same direction through the gear 69 and the three-part sleeve 66, 67, and 68; when the gear 60 is rotated, the dime wheels 56 and 156 are directly driven in the same direction, and when the gear 61 is rotated, the dollar wheel 57 is directly driven and the corresponding wheel 157 is driven in the same direction through the gear 73 and the rotating shaft 54.

As previously stated, the cost registering mechanism is driven through a shaft 14 which is connected to the variator through the gears 34, 35, and 36. This shaft 14 carries a worm 80 which meshes with a worm wheel 81 (Fig. 4) carried by a clutch sleeve 82 journalled on a sleeve 83 which, in turn, is journalled on the reset shaft 58. Also journalled on the sleeve 83 is a companion clutch sleeve 84 which is normally urged into frictional engagement with the clutch part 85 by a spring 86 abutting at its opposite ends against shoulders respectively provided on the sleeve 83 and the sleeve 84. Adjoining the sleeve 83, and journalled on the reset shaft 58, is a rotary order element of lowest (cents) order and which comprises a sleeve 87 integrally carrying the gear 59 for unitary movement therewith and through which the cents wheels are driven. This gear 59 has openings 88 which slidably receive driving lugs 89 on the inner end of the driven clutch sleeve 84 so that the sleeve 87 and the gear 59 will rotate in unison with the clutch sleeve 84, but there may be axial movement therebetween for the purpose hereinafter described more in detail. Also journalled on the shaft 58 is a second rotary order element of higher (dime) order and comprising a sleeve 90 rigidly supporting the gear 60, and a third rotary order element of highest (dollar) order and comprising a sleeve 91 rigidly supporting the gear 61. As hereinafter described, suitable carrying or transfer means are provided between the sleeve 87 and sleeve 90 and also between the sleeve 90 and the sleeve 91 so that, upon one complete revolution of the sleeve 87, gear 59 and the associated cent wheels, the sleeve 90, gear 60, and the associated dime wheels will be advanced one tenth of a revolution, and upon one complete revolution of the dime wheels, the gear 61 and the associated dollar wheels will be advanced one step.

The two sets of counter wheels III and IV of the amount registering mechanism are arranged similarly to, and driven in like manner as, those of the cost registering mechanism. As previously stated, the amount registering mechanism is driven through the shaft 13 which is connected to the meter shaft 21 through the gears 37 and 38. This shaft 13 (see Figs. 5 and 11) carries a bevel gear 80' meshing with a gear 81' forming a part of a clutch sleeve 82'. The driven clutch sleeve 84' is journalled on the reset shaft 58' and is connected by driving lugs 89' to the rotary order element of lowest order, and which element includes the sleeve 87' and the gear 59'. This element is associated with the fraction of gallons wheels 55' and 155'. Also journalled on the reset shaft 58' is a rotary order element of higher (units of gallons) order and comprising a sleeve 90' and a gear 60'. The rotary element of highest order (tens of gallons) has a sleeve 91' and a gear 61'.

Figure 4:
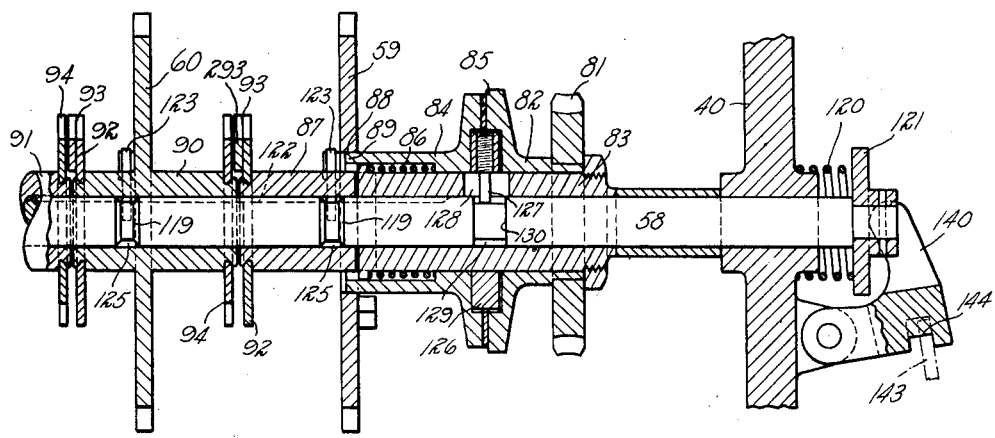
Fig. 4 is an enlarged detail view showing portions of the reset shaft and the drive means associated with the cost registering mechanism.

The transfer carrying means between the several rotary order elements will now be described. A description of the carrying means between the sleeves 87 and 90 will suffice for all such means illustrated. This carrying means is generally of an old and well-known type but has certain features of novelty and advantage. More particularly, and as shown in Fig. 4, staked to the end of the sleeve 87 is a disk 92 provided with a laterally projecting two toothed gear segment 293 rigidly secured thereto and having an intervening notch 93 between the teeth which also laterally extends through the disk. On the adjacent end of the sleeve 90 is fixed a gear 94. The numeral 95 (see Figs. 2, 5, and 10) designates a transfer pinion transversely overlying disk 92 and gear 94 and journalled on a shaft extending between the arms 96 of a rocking frame 97 pivoted on a rod 98. This pinion is provided with alternately disposed wide teeth 102 and narrow teeth 103, and is so related to the disk 92 and the gear 94 that both the narrow and wide teeth mesh with the gear 94, and the wide teeth are adapted to slidably lock against the periphery of the disk except at such times as when an intervening narrow tooth is periodically engaged by segment 293 causing a partial rotation of pinion 95 and a wide tooth to enter notch 93, thereby advancing the gear 94 and the associated numeral wheels one step. The rocking frame 97 has fixed to it an arm 99, and the corresponding rocking frame 97' of the amount registering mechanism has secured to it an arm 99'. These two arms are connected by a link 100. 101 designates a spring connected at its opposite ends to the top plate 47 of the supporting structure and the link 100 and serving the purpose of resiliently urging the transfer pinions into engagement with their respective disks and gears. For the purpose of limiting the extent to which the spring 101 may urge the transfer pinions towards the associated gears and locking disks, there is provided, as shown most clearly in Figs. 2, 10, and 11, a finger 104 on the arm of lever 99' and which finger is adapted to cooperate with a collar 105 fixed to, so as to move with, the reset shaft 58'. During the normal registering operation, the end of this finger will engage the periphery of the collar 105, as shown most clearly in Fig. 2.

In accordance with the present arrangement, we provide means for positively locking the pinions in proper meshing relation with the gears 94 during registering operations and for limiting the extent of movement of the pinions away from these gears and the associated locking disks 92 during the resetting operation in order that error in registration, due to disarrangement of the pinions with respect to their gears, is avoided. It may be stated here that should the meshing relation between a transfer pinion and its gear be accidentally changed, the registration would be affected and, more particularly, the numerals on the associated numeral wheels would not properly appear in the windows of the casing. Unless means were provided to prevent it, such disarrangement or change in relation between the pinion and its associated gear might take place should the rocking frame carrying the pinion be violently moved through too great an extent away from the gear and which action might occur should the gears be caused to jump during either the registering operation or the resetting operation. More particularly, the wide teeth 102 of the transfer pinion should, during each registering operation, engage in the same alternate spaces between the teeth of the gear 94, and the narrow teeth 103 should mesh with the intervening spaces. Should the relation become disturbed to the extent where the wide teeth engage the intervening spaces of the gear, the numerals of the counter wheels associated with that gear would not appear squarely in the windows of the casing. To accomplish the stated results, the lever 99', forming a part of the lower rocking frame 97', is provided with a limit finger 106 adapted, during registering operations, to be locked in the position shown in Fig. 2 by a flange 107 forming a part of the collar 105 which, as previously stated, is fixed to the reset shaft 58'. When the parts are in this position, the finger is closely adjacent the periphery of, and is in the plane of, the flange 107 so that neither of the rocking frames 97 and 97' can at this time rock to any appreciable extent, and the transfer pinions will be constrained to remain in operative positions. As hereinafter described more in detail, upon initial rotation of the main reset shaft 16 and before the actual resetting operation starts, the reset shafts 58 and 58' are moved axially. During such movement, the collar 105 moves from the full line position to the dotted line position shown in Fig. 11, thereby withdrawing the flange 107 from the path of finger 106 and bringing the sleeve portion 105 into the path of movement of that finger. During the operation of resetting the counter wheels, each gear 94 (unless its associated counter wheels are already at zero) is turned in a direction indicated by the arrow in Fig. 10, and the associated transfer pinion will be caused to swing back and forth about rod 98 or 98' and between the positions shown in Figs. 6 and 10 as limited by fingers 104 and 106. It is understood that as the pinion is forced outwardly by a tooth on the gear 94, the pinion will be rocked to the position shown in Fig. 10 and wherein the right-hand wide tooth engages the periphery of the locking disk so that the extent of rotation of the pinion is limited. The relation of the finger 106 to the collar 105 is such that the extent to which a transfer pinion may be swung away from its associated gear 94 is less than the radius of the pinion so that at no time can the locking arrangement between the pinion and the disk be broken except, of course, when the wide tooth engages in the notch 93 of the locking disk 92.

Figure 6:
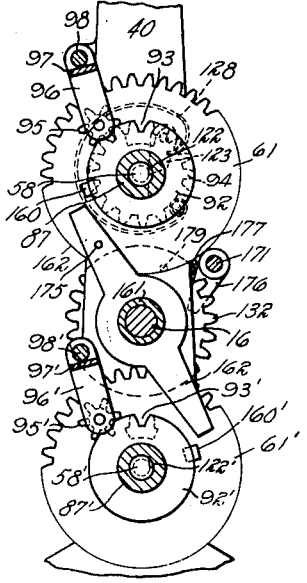
Fig. 6 is a fragmentary view of the register taken substantially on line 6—6 of Fig. 5.

Referring now to the resetting mechanism, the reset shafts 58 and 58' of the cost and amount registering mechanisms, respectively, are of similar construction and operation so a description of one will apply to both. Referring to Figs. 4, 5, and 6, the shaft 58 is mounted for limited longitudinal movement in suitable bearings in the end posts 40 of the supporting structure, and it is normally urged into the inoperative position shown in Fig. 4 by a spring 120 interposed between one of the posts and a collar 121 fixed on the end of the reset shaft. The reset shaft 58 has a longitudinally extending groove 122 adapted, when the reset shaft is in operative position and is rotated counterclockwise with reference to Fig. 6, to pick up reset pawls 123 pivoted to the respective gears 59, 60, and 61. These pawls (see Figs. 5 and 6) are normally urged by springs 128 through openings in the sleeves of the rotary order elements and against the shaft 58. This arrangement is a usual one. In order that the rotary order elements may be turned during the registering operation without interference by the reset shaft, (these elements are rotated clockwise during registration) the reset shaft is provided with spaced circumferential grooves 125 which, when the reset shaft is in the inoperative position shown in Fig. 4, accommodate the reset pawls 123. The faces 119 between the normal or larger periphery of the reset shaft and the bottoms of the grooves 125 are conical so as to form cams which will engage the reset pawls and cause them to ride out of the grooves 125 and onto the larger periphery of the shaft when the latter is moved axially to the left, with reference to Fig. 4.

Upon initial rotation of the main reset shaft, and before turning the counter wheels to reset them, it is necessary to disconnect the friction clutches between the meter driven shaft 13 and the amount registering mechanism and between the variator driven shaft 14 and the cost registering mechanism. These two clutches are engaged and disengaged in unison and in like manner. Referring particularly to the clutch comprising the members 84 and 85, the opposed faces of these members (see Fig. 4) are recessed so as to form an annular groove for the reception of a collar 126 slidably mounted on the sleeve 83 and having a pin 127 extending through a slot 128 in the sleeve 83 and into a circumferential groove 129 in the reset shaft 58. When the reset shaft is moved axially preliminary to the resetting operation, the right-hand shoulder 130 of the groove 129 will engage the pin 127 with the result that the clutch sleeve 84 will move to the left a sufficient extent to disengage the clutch. After the resetting operation has been completed, the reset shaft moves towards the right to its inoperative position, thus permitting the spring 86 to again engage the clutch.

The resetting operations of both the amount and the price registering mechanisms are effected by rotating the operating handle 131 which is connected to one end of the main reset shaft 16. On the other end of this shaft is fixed a gear 132 which meshes (see Fig. 5) with gears 133 and 133' respectively fixed to the left-hand ends of the reset shafts 58 and 58'. On initial turning movement of the main reset shaft 16, the reset shafts 58 and 58' are moved longitudinally, in the present instance towards the left, referring to Figs. 4 and 5, in order to bring the portions of the reset grooves in those shafts into proper relation with the reset pawls and also to disengage the friction clutches, as previously described. To this end, the following arrangement is provided: Pivoted to the right-hand post 40 of the supporting structure are yokes 140 and 140', the yoke arms of which respectively engage against the outer faces of the disks or collars 121 and 121' fixed to the reset shafts. Journalled on the projecting end of the main reset shaft 16 is a lever member in the form of a disk 141 to which is pivoted, at diametrically opposite points, links 143 and 143' respectively pivoted at their outer ends, as at 144 and 144', to the yokes 140 and 140'. Fixed to the shaft 16 adjacent the disk 141 is a cam 145 in the form of a concentric disk having a generally V-shaped notch 146, the forward edge 147 and the rear edge 148 of which are more or less radial. Fixed to the end of a rod 149 journalled in the supporting structure is a lever 150 carrying a locating pin 151 adapted to engage in the notch 146 of the cam 145 and to ride on the periphery of said cam. This lever is connected between its ends by a link 152 to the disk 141. With this arrangement, upon initial rotation of the shaft 16, the edge 148 of the notch 146 of the cam 145 will cam the pin 151 outwardly, thereby causing the lever 150 to swing upwardly with the result that the disc 141 will be rotated through the link 152 and the yokes 140 and 140' will be turned in a direction to compress the springs 120 and 120' and cause the reset shafts 58 and 58' to move to operative positions wherein the reset grooves 122 and 122' are in registry with the reset pawls 123 and 123' and the friction clutches are disengaged. On further continued rotation of the main reset shaft, the reset pawls of those numeral wheels not standing at zero will be picked up, with the result that all of such numeral wheels will be brought to zero position upon completion of the resetting operation of the shaft 16. When a resetting operation of that shaft is completed, the pin 151, under the influence of the springs 120 and 120', will ride into the notch 146 and, while so doing, will cause a slight retrograde rotary movement of the main reset shaft and the reset shafts 58 and 58' so that, on the next resetting operation, the longitudinal reset grooves in the reset shafts will be in a position to pick up the reset pawls of those counter units which have closely approached, but not reached, a zero position during the previous registering operation. Also upon such retrograde movement of the main reset shaft, the hereinafter described overthrow preventing arms will be moved into inoperative positions. Of course, when the pin drops into the notch 146, the springs 120 and 120' will cause the reset shafts to move to inoperative position with the result that the clutches will again be engaged.

For the purpose of preventing overthrow of the numeral wheels, and which overthrow might occur should the resetting operation be carried out very quickly and abruptly stopped when the pin 151 drops into the notch 146, the following arrangement is provided: On each of the gears 59, 60, and 61 and 59', 60', and 61', is a lug 160. On the main reset shaft 16 is frictionally mounted a sleeve 161 having radially extending arms 162, one for each lug 160. The outer ends of these arms form stops for the lugs 160. At the opposite ends of the sleeve 161 and fixed to the shaft 16 (see Fig. 12) are collars 163 and 164, and between the collar 164 and the adjacent end of the sleeve is a four-fingered spring plate 165 which serves to frictionally clutch the sleeve to the shaft 16. It is required that the arms 162 be held out of the path of movement of the lugs 160 on initial turning movement of the shaft 16 in order to permit the lugs to clear the arms associated with those order elements which have closely aproached, but not reached, zero position. Therefore, means is provided for holding the arms temporarily out of operation. This means (see Figs. 2 and 9) includes a hold-out member 170 in the form of an arm fixed to a rock shaft 171 journalled in ears 172 extending from the central posts 40 of the supporting frame. The outer end of this arm has two shoulders or abutments 173 and 174 in stepped relation and against which shoulders a stud 175 on one of the arms 162 is adapted to engage. Between the shoulders is a recess or seat 199. On the left-hand end of the rock shaft 171 is an arm 176, and extending from the left-hand post 40 is a pin 177 with which the arm 176 is adapted to cooperate for limiting the extent of upward movement of that arm and the hold-out arm 170. A spring 178 is connected at its opposite ends to the top cross piece 47 of the supporting structure and the arm 170 and normally holds the stop arm 170 in the raised position shown in Fig. 2 and by full lines in Fig. 9, and in which position the outer abutment 173 is in the path of movement of the stud 175. Carried by the gear 132, which is fixed to the left-hand end of the supporting shaft 16, is a pin 179 which, when the gear is turned, is adapted to wipe against the arm 176 and thereby rock the shaft 171 to such an extent that the hold-out arm will be lowered to the dash-dot line position shown in Fig. 9 so that the outer abutment 173 is withdrawn from the path of movement of the stud 175 and the inner abutment 174 is brought into the path of movement of that stud. In the normal position of the parts, the pin 179, as shown most clearly in Figs. 6 and 9, is spaced somewhat from the arm 176 so that, upon the resetting operation, the hold-out arm is not lowered until after the gears, which carry the lugs 160, have been rotated somewhat. When the hold-out arm is lowered, the stop arms 162, due to their frictional engagement with the main reset shaft 16 which is being rotated, are moved to the operative position shown by dot-dash lines in Fig. 9, further movement of the arms being prevented by the engagement of the stud 175 against the shoulder 174 of the hold-out arm. In this position of the stop arms 162, the ends thereof are disposed in the path of movement of the lugs 160 so that, on completion of the reset operation, the lugs will engage the arms and thus prevent overthrow of the counter wheels. During the resetting operation, the hold-out stop is prevented from upward movement owing to the fact that the stud 175 engages the seat 199 between the stepped shoulders 173 and 174. On completion of the resetting operation, that is when one rotation of the main reset shaft has been completed, the pin 151 on the lever 150 rides into the notch of the cam 145 and, as the pin wipes against the rear edge 148 of this notch, it causes a retrograde movement of the main reset shaft with the result that the stop arms 162 (after they have served their functions) are moved to the inoperative positions shown in Fig. 6.

It will be observed that during the initial rotation of the main reset shaft 16 and before the actual resetting operation of the numeral wheels, the reset shafts 58 and 58' are moved axially through the cam 145, lever 150, link 152, disc 141, and the shift yokes 140 and 140', and, at the same time shafts 58 and 58' are turned slightly counterclockwise (referring to Figs. 6 and 9) through the gears 132, 133, and 133'. When the reset shafts are thus initially moved, the stop arms 162 are moved to the full line position shown in Fig. 9, being stopped in that position by the hold-out member 170. In the event that one of the rotary order elements is in a position to locate its associated count wheels in zero position upon initial rotation of the main reset shaft, the reset pawl associated with that element will not be picked up until the resetting operation has been almost completed. In Fig. 9, the gear 59 is shown as being at zero position and the reset shaft 58 has been moved axially and turned slightly. It is clear from this figure that the reset pawl has escaped the reset groove. In the event one of the order elements has almost, but not quite, reached its zero position, the reset pawl of that element will be immediately picked up by the reset groove in the reset shaft and, therefore, it is necessary that the stop arms be held in the full line position shown in Fig. 9 until the lug 160 of that element has passed beyond the outer end of the stop arm. After the lug is moved to such an extent, the hold-out arm is lowered to the dash-dot line position shown in Fig. 9. An instant before the completion of the resetting operation, and as the pin just starts to drop into the notch 146 of the cam, all of the reset pawls, including those associated with the order elements which were at zero position when the resetting operation started, will have been picked up and the lugs 160 of the elements will be engaged against the respective stop arms (as shown in Fig. 9a) so that overthrow of each numeral wheel is prevented. It will be noted from Fig. 9a that, at this time, a tooth on the gear 94 has moved the associated transfer pinion outwardly somewhat and, therefore, the spring 101 associated with the rocking frame carrying that pinion is placed under increased tension. Then, as the pin 151 moves further into the notch 146 and rides inwardly along the edge 148 thereof, the reset shafts move axially into their inoperative positions; the stop arms are moved to the inoperative positions shown in Fig. 6; and the order elements and the numeral wheels connected thereto are rotated slightly in the directions in which they are rotated during registrating operations so as to bring the wheels into accurate zero position, the wheels having been moved slightly past the zero position when the lugs 160 were engaged with the ends of the stop arms. This slight movement of the numeral wheels to accurate zero position is effected by the movement of the transfer pinion under the influence of the spring 101 into full meshing engagement with its associated gear 59.

It is further noted that, with the arrangement described, the operator cannot manipulate the reset shaft in order to falsify the registrations, as indicated by the counters, by only partially rotating the operating reset shaft 16 and then turning it back to its normal position. As previously stated, upon initial rotation of the operating reset shaft, the friction clutches associated with the price and amount registering mechanisms are disengaged, and the pin 179 carried by the gear 132 wipes by the arm 176 which is fixed to the same rock shaft as is the hold-out arm 170. After the pin wipes by that arm, the arm, under the influence of the spring 178, moves back into the path of movement of the pin. Then, on continued rotation of the reset shaft in the proper direction, resetting of the numeral wheels is effected. Should the operator, after he has partially effected resetting operation, and before he has completed it, attempt to move the operating reset shaft in the reverse direction, the pin 179 will engage the lower end of the arm 176, thus preventing the operator from moving the resetting mechanism fully back to normal position. Therefore, the operator, to bring the parts back to normal position, must complete the rotation of the operating reset shaft in the proper direction and when such resetting operation has been completed, the pin 151, under the influence of the springs 120, will be forced into the notch 146 of the cam 145, as previously described. It will also be evident that the operating handle 131 and main reset shaft 16 may not be rotated backwardly at the start of a resetting operation to falsify the positioning of the numeral wheels. As illustrated in Fig. 1, it will be noted that whenever pin 151 lies in the bottom of notch 146, the combined center distances from rod 149 to pin 151 to shaft 16 considerably exceeds the straight line center distance between rod 149 and shaft 16. Hence, notch 146 limits the extent of downward movement of arm 150 and prevents a backward rotation of shaft 16 at the start of a resetting operation.

As previously stated, the totalizer C is driven in unison with the cost indicators for registering the total amount of dollars and cents received for the quantity of liquid dispensed, and the totalizer D is driven in unison with the amount indicators for registering the total amount of liquid dispensed during a succession of transactions. These totalizers may be of any suitable kind such, for example, as counters of the type having a plurality of non-resetting counter wheels with suitable transfer mechanism between the wheels. The wheels of the totalizer C are mounted on a shaft carrying a gear 200 which meshes with a gear 201 carried by a shaft 202 journalled in a bearing provided on the cross bracket 50. On the other end of this shaft is a gear 203 which is driven through an idler 204 by a gear 205 fixed to the lower end of an inclined shaft 206. The upper end of this shaft is provided with a gear 207 meshing with a gear 208 to which is fixed a worm wheel 209 meshing with a worm 210 on the upper end of the shaft 14 and through which shaft the cost registering mechanism is driven. The drive for the amount totalizer is similar to that just described and the corresponding parts thereof are designated by similar character references, except that these references are primed. In this instance, however, it is noted that the driving connection is taken off of a worm 211 fixed to the shaft 13 and through which shaft the amount registering mechanism is driven.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language used in the following claims is intended to cover all of the generic and specific features of the invention herein described and all statements of the scope of the invention which, as a matter of language, might be said to fall therebetween.

We claim as our invention:

1. In combination, a plurality of counter mechanisms each including a plurality of coaxial operatively connected number wheels, driving mechanism therefor having a clutch therein controlling the drive of said counter mechanisms, a rotatable resetting member, and reciprocable means reciprocated upon rotation of said resetting member and controlling said clutch to disconnect said counter mechanisms from said drive during resetting.

2. In combination, a plurality of counter mechanisms each including a plurality of coaxial operatively connected number wheels, driving mechanism therefor having a clutch therein controlling the drive of said counter mechanisms, a rotatable resetting member, and reciprocable means reciprocated upon rotation of said resetting member and controlling said clutch to disconnect said counter mechanisms from said drive during resetting, said resetting member being rotatable on an axis parallel to the axes of said number wheels and said reciprocable means including a reciprocable clutch controlling member carried on said resetting member.

3. In combination, a plurality of counter mechanisms each including a plurality of coaxial operatively connected number wheels, driving mechanism therefor having a clutch therein controlling the drive of said wheels, and resetting mechanism including a rotatable cam and means operable by said cam to disconnect and connect said clutch at the beginning and end of resetting.

4. In combination, a plurality of counter mechanisms each including a plurality of coaxial number wheels, driving mechanism therefor including a plurality of rotary order elements, each driving a wheel of each counter mechanism, and also having a clutch in said driving mechanism controlling the drive of all of said wheels, and resetting mechanism including a rotatable reset operating member and means operable upon rotation thereof to disconnect and connect said clutch at the beginning and end of resetting.

5. In combination, a plurality of counter mechanisms each including a plurality of coaxial number wheels, driving mechanism therefor including a plurality of rotary order elements, each driving a wheel of each counter mechanism, and also having a clutch in said driving mechanism controlling the drive of all of said counter mechanisms, and resetting mechanism including a rotatable resetting member and means operable upon rotation of said member for disconnecting said clutch and thereafter rotating said number wheels in a direction opposite to the counting direction thereof to effect resetting.

6. In combination, a plurality of counter mechanisms each including a plurality of coaxial number wheels, driving mechanism for driving the lowest order wheels including a plurality of rotary order elements, each driving a wheel of each counter mechanism, and also having a clutch in said driving mechanism controlling the drive of all of said wheels, transfer mechanism locked during counting and driving the higher order wheels, and resetting mechanism having means controlled thereby for disconnecting said clutch and unlocking said transfer mechanism before resetting said wheels.

7. In combination, a plurality of coaxial number wheels, driving mechanism therefor including coaxial rotary order elements and a clutch controlling the drive thereof, transfer pinions positively connecting said order elements during counting, and resetting mechanism for said number wheels having means for disconnecting said clutch and unlocking said transfer mechanism before resetting said wheels.

8. In combination, a plurality of sets of counter mechanisms each including a plurality of number wheels, driving mechanism therefor including a plurality of superimposed sets of coaxially disposed rotary order elements each operatively connected to drive a plurality of said wheels in one set, and resetting mechanism for said number wheels including a centrally located rotatable reset operating member and having operative connections rotatable thereby to effect resetting of all of said wheels.

9. In combination, a plurality of sets of counter mechanisms each including a plurality of number wheels, driving mechanism therefor including a plurality of superimposed sets of coaxially disposed rotary order elements each operatively connected to drive a plurality of said wheels in one set, and resetting mechanism for said number wheels including a centrally located rotatable reset operating member and having operative connections controlled thereby and controlling the rotation of said rotary elements before effecting resetting of said number wheels.

10. In combination, two sets of counter wheels in side by side relation, a shaft between said sets of wheels stationary during counting and rotatable during resetting, rotary order elements on said shaft and through which said wheels are driven during a registering operation and reset during a resetting operation, and transfer means between successive elements.

11. In combination, two sets of counter wheels in side by side relation, a shaft between said sets of wheels, rotary order elements on said shaft and through which said wheels are driven during registering operation and reset during resetting operation, transfer means between successive elements, driving means for rotating said elements in one direction relative to said shaft during a registering operation, and means for rotating said elements in the opposite direction with said shaft during a resetting operation.

12. In combination, two corresponding sets of aligned numeral wheels of successively different orders, said sets being arranged in side by side relation, the wheels of one set being arranged in an order reverse to those of the other set each of said wheels having a coaxial driven gear operatively connected therewith, a shaft between said sets of wheels, a plurality of order elements mounted on said shaft for rotation relative thereto and each having a coaxial gear directly meshing with the driven gears of said wheels of corresponding order, transfer means between successive order elements, and means for driving the element of lowest order.

13. In combination, two corresponding sets of counter wheels arranged in side by side relation and having wheels of successively different orders, the wheels of one set being arranged in an order reversed to those of the other set, a shaft between said sets of wheels, rotary order elements on said shaft and respectively connected in driving relation to corresponding order wheels of the two sets, transfer means between said order elements, and means for driving each order element of lowest order while said shaft is stationary.

14. In combination, two corresponding sets of counter wheels arranged in side by side relation and having wheels of successively different orders, the wheels of one set being arranged in an order reverse to those of the other set, each of said wheels having a driven gear operatively connected thereto, a reset shaft between said sets of wheels, rotary order elements on said reset shaft and each having a gear meshing with the gears of said wheels of corresponding order, reset pawls carried by said order elements, transfer means between said order elements, means for driving the order element of lowest order in one direction relative to said shaft during registering operations, and means for rotating said shaft to rotate said elements in the opposite direction during resetting operations.

15. In combination, a reset shaft having a plurality of rotary counter elements of successively different orders and each provided with a gear, a supporting shaft to one side of said reset shaft, a set of counter wheels arranged on said supporting shaft and having gears respectively meshing with said gears of said order elements, a rotatable supporting shaft on the other side of said reset shaft, a corresponding set of counter wheels on said shaft arranged in reverse relation to those of the other set, the wheel of highest order of said second set being fixed to said second supporting shaft, a gear fixed to said second supporting shaft and meshing with the gear of the element of highest order, a sleeve on said second supporting shaft operatively connected with the gear of the rotary order element of lowest order and driving the lowest order counting wheel of said second set, the wheel of intermediate order of said second set being journaled on said sleeve and having a gear meshing with the gear of the element of intermediate order, transfer means between said order elements, and means for driving the order element of lowest order.

16. In combination, two corresponding sets of counter wheels of successively different orders and spaced in side by side relation, a reset shaft between said sets of wheels, rotary order elements rotatably mounted on said shaft and each respectively associated in driving relation to two wheels of corresponding order of the two sets, means carried by said elements and adapted to co-operate with said shaft to reset said elements and wheels to zero positions when the shaft is rotated in a predetermined direction, transfer mechanism between an order element of lower order and an order element of next higher order, means for driving the order element of lowest order during registering operation while said shaft remains stationary, and means for rotating said reset shaft during resetting operation.

17. In combination, two corresponding sets of aligned numeral wheels of successively different orders, said sets being arranged in side by side relation, each of said wheels having a driven gear fixedly associated therewith, a reset shaft between said sets of wheels, a plurality of order elements mounted on said shaft for rotation relative thereto during registering and each having a gear meshing with the gears of said wheels of corresponding order, transfer means between successive order elements, reset pawls carried by said elements and adapted to cooperate with said reset shaft, means for rotating said order elements in one direction during a registering operation, and means for rotating said reset shaft in the opposite direction during a resetting operation.

18. In combination, two corresponding sets of counter wheels of successively different orders and spaced in side by side relation, a reset shaft between said sets of wheels, rotary order elements rotatably mounted on said shaft and each respectively associated in driving relation to two wheels of corresponding order of the two sets, means carried by said elements and adapted to cooperate with said shaft to reset said elements and wheels to zero positions when the shaft is rotated in a predetermined direction, transfer means between an order element of lower order and an order element of next higher order, means including a breakable connection for driving the order element of lowest order during registering operation, means for rotating said reset shaft during resetting operation, and means operated by said last mentioned means for disengaging said connection before resetting said elements and wheels and engaging it after the resetting operation has been completed.

19. In combination, two corresponding sets of counter wheels of successively different orders and spaced in side by side relation, a reset shaft between said sets of wheels and movable axially into and out of operative position, rotary order elements rotatably mounted on said shaft and each respectively associated in driving relation to two wheels of corresponding order of the two sets, means carried by said elements and adapted to cooperate with said shaft to reset said elements and wheels to zero positions when said shaft is in operative position and is rotated in a predetermined direction, transfer mechanism between an order element of lower order and an order element of next higher order, means for driving the order element of lowest order during registering operation, means for rotating said reset shaft during resetting operation, and means operated by said last mentioned means for shifting said shaft to operative position before resetting the wheels and moving it to inoperative position after the resetting operation has been completed.

20. In combination, two corresponding sets of aligned numeral wheels of successively different orders, said sets being arranged in side by side relation, each of said wheels having a driven gear fixedly associated therewith, a reset shaft between said sets of wheels and arranged to be moved axially into and out of operative position, a plurality of order elements mounted on said shaft for rotation relative thereto and each having a gear meshing with the gears of said wheels of corresponding order, transfer means between successive order elements, reset pawls carried by said elements and adapted to cooperate with said reset shaft, means for rotating said order elements in one direction during the registering operation, means for rotating said reset shaft in the opposite direction during resetting operation, and means operated by said last mentioned means for shifting said shaft axially to operative position before actually resetting said counter wheels and then shifting said shaft to inoperative position after the resetting operation has been completed.

21. In combination, two corresponding sets of counter wheels of successively different orders and spaced in side by side relation, a reset shaft between said sets of wheels and mounted for axial movement into and out of operative position, rotary order elements rotatably mounted on said shaft and each respectively associated in driving relation to two wheels of corresponding order of the two sets, means carried by said elements and adapted to cooperate with said shaft to reset said elements and wheels to zero positions when the shaft is in operative position and is rotated in a predetermined direction, transfer means between an order element of lower order and an element of next higher order, means including a breakable connection for driving the order element of lowest order during registering operation, means for rotating said reset shaft during resetting operation, and means operated by said last mentioned means for axially moving said shaft to operative position and for disengaging said connection before resetting said elements and for moving said shaft to inoperative position and engaging said connection at the completion of the resetting operation.

22. In combination, a first counter mechanism and a second counter mechanism; each of said mechanisms including a reset shaft mounted for axial movement into and out of operative resetting position, a plurality of rotary order elements of successively different denominations on each of said shafts, transfer means between adjacent order elements, and means for driving the elements of lowest order; said reset shafts being in spaced parallel relation, an operating shaft between said reset shafts and geared therewith for turning said reset shafts during the resetting operation, and means associated with and operated by said operating shaft for shifting the reset shafts to operative positions before resetting said elements and permitting them to move to inoperative positions after the resetting operation has been completed.

23. In combination, a first counter mechanism and a second counter mechanism; each of said mechanisms including a reset shaft mounted for axial movement into and out of operative resetting position, a plurality of rotary order elements, and means comprising a clutch for driving the element of lowest order; said reset shafts being in spaced parallel relation, an operating shaft between said reset shafts and geared therewith for turning said reset shafts during the resetting operation, and means associated with and operated by said operating shaft for axially moving said reset shafts to operative positions and for disengaging said clutches before resetting said elements and permitting said reset shafts to move to inoperative positions and said clutches to be engaged after the resetting operation has been completed.

24. In combination, a counter having a reset shaft, a plurality of order elements of successively different denominations rotatably mounted thereon, transfer means between said elements, means for driving the element of lowest order, an operating shaft geared to said reset shaft and adapted to turn the same to effect resetting of said elements to zero positions, and means for preventing overthrow of said elements upon completion of the resetting operation and including a shoulder on each element and stop means on said operating shaft including a plurality of abutments adapted to be respectively engaged by said shoulders on the completion of the resetting operation.

25. In combination, a counter having a reset shaft, a plurality of order elements of successively different denominations rotatably mounted thereon, transfer means between said elements, including a plurality of gears driving different elements, an operating shaft geared to said reset shaft and adapted to turn the same to effect resetting of said elements to zero positions; means for preventing overthrow of said elements upon completion of the resetting operation and including a shoulder on the gear driving each element, and a stop member on said operating shaft having a plurality of abutments adapted to be respectively engaged by said shoulders on the completion of the resetting operation, said stop member being frictionally supported on said operating shaft; and means for imparting a reverse rotary movement to said operating shaft and abutments on completion of the resetting operation.

26. In combination, a counter having a reset shaft, a plurality of order elements of successively different denominations rotatably mounted thereon, transfer means between said elements, means for driving the element of lowest order, an operating shaft geared to said reset shaft and adapted to turn the same to effect resetting of said elements to zero positions; means for preventing overthrow of said elements upon completion of the resetting operation and including a shoulder on each element, and a stop member on said operating shaft having a plurality of abutments adapted to be respectively engaged by said shoulders on the completion of the resetting operation, said stop member being frictionally supported on said operating shaft; means for preventing said stop member from moving to stop position during initial rotation of said operating member, and means for imparting a reverse rotary movement to said operating shaft and arms on completion of the resetting operation.

27. In combination, a counter having a reset shaft, a plurality of order elements of successively different denominations rotatably mounted thereon, transfer means between said elements, means for driving the element of lowest order, an operating shaft geared to said reset shaft and adapted to turn the same to effect resetting of said elements to zero positions; means for preventing overthrow of said elements upon completion of the resetting operation and including a shoulder on each element, and a stop member on said operating shaft having a plurality of abutments adapted to be respectively engaged by said shoulders on the completion of the resetting operation, said stop member being frictionally supported on said operating shaft; a pivoted hold-out arm for preventing said stop member from being moved to stop position during initial rotation of said operating shaft, means normally holding said hold-out arm in operative position, means associated with said operating shaft for moving said hold-out arm to inoperative position upon initial rotation of said shaft, and means for imparting a reverse rotary movement to said operating shaft and arms on completion of the resetting operation.

28. In combination, a counter having a reset shaft, a plurality of order elements of successively different denominations rotatably mounted thereon, transfer means between said elements, an operating shaft geared to said reset shaft and adapted to turn the same to effect resetting of said elements to zero positions; means for preventing overthrow of said elements on completion of the resetting operation and including a shoulder on one of said elements and a stop member frictionally carried by said operating shaft and having an abutment adapted to engage said shoulder on the completion of the resetting operation; a hold-out member cooperating with said stop member for holding the same in inoperative position upon initial rotation of said shaft, an arm in fixed relation to said hold-out member, and a pin rotatable with said shaft and adapted to engage said arm to move said hold-out member to inoperative position, said arm and pin constituting means for preventing rotation of said operating shaft in the wrong direction after said hold-out member has been moved to inoperative position whereby falsifying of the count is prevented.

29. In combination, a counter mechanism having a rotatable reset shaft mounted for axial movement into and out of operative resetting position, a spring normally urging said shaft into inoperative position, a plurality of rotatable rotary order elements of successively different denominations on said shaft, reset pawls carried by said elements and adapted to be engaged with said shaft to reset said elements to predetermined positions when the shaft is turned in a predetermined direction, transfer means between adjacent order elements, an operating shaft adapted upon one complete rotation to reset said counter mechanism to zero, a cam fixed to said shaft and having a notch, a pivoted arm having a pin adapted to engage in said notch and to limit the extent of rotation of said cam to one complete revolution, and an operative connection between said arm and reset shaft for compressing said spring and axially moving said reset shaft to operative position upon initial rotation of said operating shaft, said spring forcing said pin into said notch upon completion of the resetting operation.

30. In combination, two sets of counter wheels in side by side relation, a shaft between said sets of wheels, rotary elements on said shaft through which said wheels are driven during registering operation and reset during resetting operation, driving means for rotating said elements in one direction during the registering operation, manually operable means for rotating said elements in the opposite direction during resetting operation, and a supporting structure for said parts and comprising three units, namely, a center unit composed of two spaced frame members supporting said shaft, driving means, and manually operable means, and two subunits disposed on opposite sides of said center unit and detachably connected thereto and each comprising two spaced frame members, said subunits respectively supporting said sets of counter wheels.

31. In combination, aligned rotary order elements, transfer means therebetween; said transfer means including a locking disk provided with a two-tooth transfer segment on an element of lower order, a gear on an element of next higher order, and a transfer pinion having alternate wide and narrow teeth all of which are adapted to mesh with said gear and the wide teeth of which are adapted to lock against said disk except when a transfer is being effected; means for supporting said pinion for movement toward and away from said disk and gear to respective operative and inoperative positions, and means for limiting the extent of movement of said pinion away from said members during the resetting operation to a distance less than the radial extent of said long teeth whereby the pinion may rotate only during transferring operations.

32. In combination, aligned rotary order elements, transfer means therebetween; said transfer means including a locking disk on an element of lower order and provided with a two-toothed transfer segment, a gear on an element of next higher order, and a transfer pinion having alternate wide and narrow teeth all of which are adapted to mesh with said gears and the wide teeth of which are adapted to lock against said disk except when a transfer is being effected; means for supporting said pinion for movement toward and away from said disk and gear to respective operative and inoperative positions, means for locking said pinions in operative position during counter operations, and means for limiting the extent of movement of said pinion away from said members during the resetting operation to a distance less than the radial extent of said long teeth whereby the pinion may rotate only during transferring operations.

33. In combination, a reset shaft having a series of order elements journalled thereon in spaced relation, reset pawls carried by said elements and adapted to cooperate with the reset shaft, means to shift the reset shaft into driving engagement with said pawls, a locking disk on each element of lower order and having a two-tooth transfer segment, a gear on the adjacent element of next higher order, a transfer pinion associated with each gear and disk and having alternate wide and narrow teeth arranged to periodically impart a predetermined partial rotation to an element of higher order, means to rotate the element of lowest order to perform a counting operation, a movable support arranged to shift the pinions into and out of operative positions, and means for automatically locking the pinions in operative positions during a counting operation and permitting the pinions to shift out of operative positions during resetting, said means being operated in timed relation to the shifting movement of the reset shaft.

34. In combination, a reset shaft having a series of denominational order elements journalled thereon in spaced relation, transfer mechanism between adjacent order elements including a transfer pinion arranged to periodically transmit a partial rotation to an element of higher order from an adjacent element of lower order, driving means associated with the element of lowest order, a reset pawl associated with each element, means to axially shift the reset shaft into driving engagement with said pawls, means for supporting said pinions for movement towards and away from operating position, means for limiting the extent of pinion movement into and out of operative position, a resilient member tending to maintain the pinions in operative positions, and a locking device operable in timed relation with the shifting movement of the reset shaft to secure the pinions to inoperative position during a counting operation and permit them to move out of operative position through a distance less than the radial extent of said pinions during resetting whereby each pinion is constrained to rotate only during a transferring operation.

35. In combination, a reset shaft having a series of order elements journalled thereon, transfer mechanism including a transfer pinion connected between each pair of adjacent elements, means to rotate the element of lowest order to perform a counting operation, means to axially shift the reset shaft into driving engagement with the order elements, and means to rotate said shaft to perform a resetting operation, a pivotal support arranged to support said pinion, a spring normally tending to maintain the pinions in operative positions, a pair of fingers connected to the pivotal support, a member between said fingers and cooperating therewith for limiting the extent to which said spring may move said pinions to operative positions during counting operations and for limiting the extent to which said pinions may move to inoperative positions during resetting, and a flange associated with said member and moved in timed relation to the shift movement of said shaft for locking said pinions in operative positions during counting operations.

36. In combination, two corresponding sets of counter wheels of successively different orders and spaced in side by side relation, a shaft between said sets of wheels, rotary order elements rotatably mounted on said shaft and each respectively associated in driving relation to two wheels of corresponding order of the two sets, transfer means between said elements, means for driving the element of lowest order, a reset operating shaft adapted to effect resetting of said elements to zero positions, and means for preventing overthrow of said elements upon completion of the resetting operation and including a shoulder on each element and a plurality of abutments adapted to be respectively engaged by said shoulders on the completion of the resetting operation.

JAMES BERNARD HOYE.
EDWARD ALFRED SLYE.